United States Patent
Wiemker et al.

(10) Patent No.: US 12,465,294 B2
(45) Date of Patent: Nov. 11, 2025

(54) LOCAL SPECTRAL-COVARIANCE OR LOCAL SPECTRAL COVARIANCE DEFICITS COMPUTATION AND DISPLAY FOR HIGHLIGHTING OF RELEVANT MATERIAL TRANSITIONS IN SPECTRAL CT AND MR

(71) Applicant: KONINKLIJKE PHILIPS N.V., Eindhoven (NL)

(72) Inventors: Rafael Wiemker, Kisdorf (DE); Liran Goshen, Pardes-Hanna (IL); Hannes Nickisch, Hamburg (DE); Claas Bontus, Hamburg (DE); Tom Brosch, Hamburg (DE); Jochen Peters, Norderstedt (DE); Rolf Jürgen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 124 days.

(21) Appl. No.: 18/038,546

(22) PCT Filed: Nov. 28, 2021

(86) PCT No.: PCT/EP2021/083262
§ 371 (c)(1),
(2) Date: May 24, 2023

(87) PCT Pub. No.: WO2022/117468
PCT Pub. Date: Jun. 9, 2022

(65) Prior Publication Data
US 2024/0090849 A1    Mar. 21, 2024

(30) Foreign Application Priority Data
Dec. 1, 2020   (EP) .................................... 20210977

(51) Int. Cl.
*A61B 5/00* (2006.01)
*A61B 5/055* (2006.01)
(Continued)

(52) U.S. Cl.
CPC ............ *A61B 5/7425* (2013.01); *A61B 5/055* (2013.01); *G06V 10/44* (2022.01); *G06V 10/764* (2022.01)

(58) Field of Classification Search
CPC ... A61B 5/7425; A61B 5/055; A61B 2576/00; A61B 5/7267; G06V 10/44;
(Continued)

(56) References Cited

U.S. PATENT DOCUMENTS

| | | |
|---|---|---|
| 2007/0189443 A1 | 8/2007 | Walter |
| 2014/0119668 A1 | 5/2014 | Kwon |
| 2019/0290226 A1 | 9/2019 | Gotman |

FOREIGN PATENT DOCUMENTS

WO   WO2019237179 A1   12/2019

OTHER PUBLICATIONS

Bazin et al. 2019 Frontiers in Neuroscience 13:article 1066 10 pages (Year: 2019).*
(Continued)

*Primary Examiner* — Keith M Raymond
*Assistant Examiner* — Patrick M Mehl
(74) *Attorney, Agent, or Firm* — Larry Liberchuk

(57) ABSTRACT

The present invention relates to multispectral imaging. In order to improve an identification of relevant multispectral material transitions (in particular caused by injected contrast agent), an apparatus is proposed to use the local maxima of the variances and/or covariances of the intensities of the multi-channel images to locate material transitions. In comparison to gradient vectors, the local variance is not directed and not prone to noise. An alternative apparatus is proposed
(Continued)

to use the local covariance deficits of the intensities of the multi-channel images to locate material transitions. The proposed alternative approach is independent of spatial drifts across the image volume.

11 Claims, 7 Drawing Sheets

(51) Int. Cl.
  *G06V 10/44* (2022.01)
  *G06V 10/764* (2022.01)
(58) Field of Classification Search
  CPC .... G06V 10/764; G06V 10/50; G06V 10/803; G06F 18/2413; G06F 18/251
  See application file for complete search history.

(56) References Cited

OTHER PUBLICATIONS

Carriera-Perpinan et al. 2015 in Handbook of Cluster Analysis Chapt. 18 383-417 (Year: 2015).*
Deng et al. 2019 Hindawi BioMed Res International 2019 Article ID 7614589 8 pages (Year: 2019).*
Tu et al. 2018 IEEE Journal of Selected Topics in Applied Earth Observations and Remote Sensing 11:4113-4127 (Year: 2018).*
PCT International Search Report, International application No. PCT/EP2021/083262, Jun. 7, 2022.
Wiemker Rafael et al: "Towards Reduced-Preparation Spectral-CT-Colonography Utilizing Local Covariance", Medical Imaging 2020: Image Processing, Mar. 10, 2020 (Mar. 10, 2020), p. 17, XP055803386.
Fulwadhva Urvi P. et al: "Use of Dual-Energy CT and Iodine Maps in Evaluation of Bowel Disease", Radiographics, vol. 36, No. 2, Mar. 1, 2016 (Mar. 1, 2016), pp. 393-406, XP055804017.
Tuzel O. et al., "Region Covariance: A Fast Descriptor for Detection and Classification", Aug. 23, 2020, Computer Vision—ECCV 2020 : 16th European Conference, Glasgow, UK, Aug. 23-28, 2020 : Proceedings; [Lecture Notes in Computer Science; ISSN 0302-9743], pp. 589-600, XP047529939.
Cirujeda P. et al., "Medical Image Classification Via 2D Color Feature Based Covariance Descriptors", Jan. 1, 2015, XP055924470. retrieved from the Internet: URL:http://ceur-ws.org/Vol-1391/44-CR.pdf [retrieved on May 24, 2022].
Gutjahr R. et al., "Material Decomposition and Virtual Non-Contrast Imaging in Photon Counting Computed Tomography: An Animal Study", Proceedings of SPIE 9783, Medical Imaging 2016: Physics of Medical Imaging, 97831G, Mar. 25, 2016.
Willemink MJ. et al., "Photon-Counting CT: Technical Principles and Clinical Prospects", Radiology, vol. 289, No. 2, pp. 293-312, Nov. 2018.
Jähne B. et al., "Digital Image Processing", Chapter 4 and Chapter 5, pp. 99-142, Springer 2005.

* cited by examiner

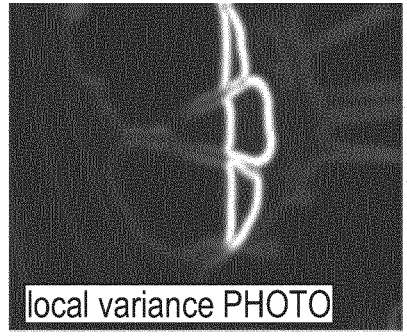 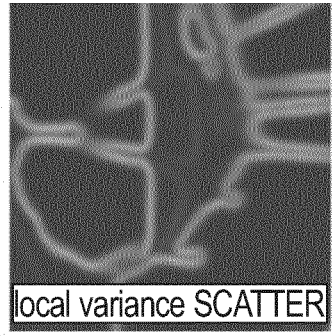 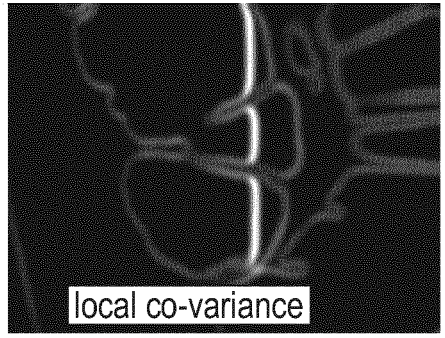
Fig. 2A     Fig. 2B     Fig. 2C
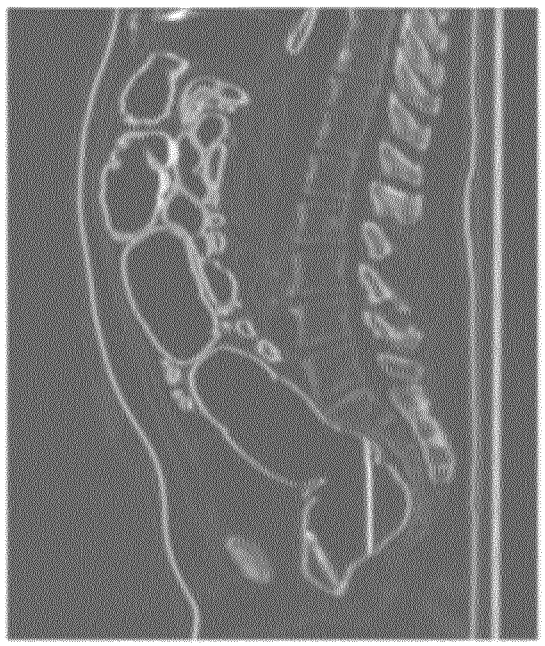 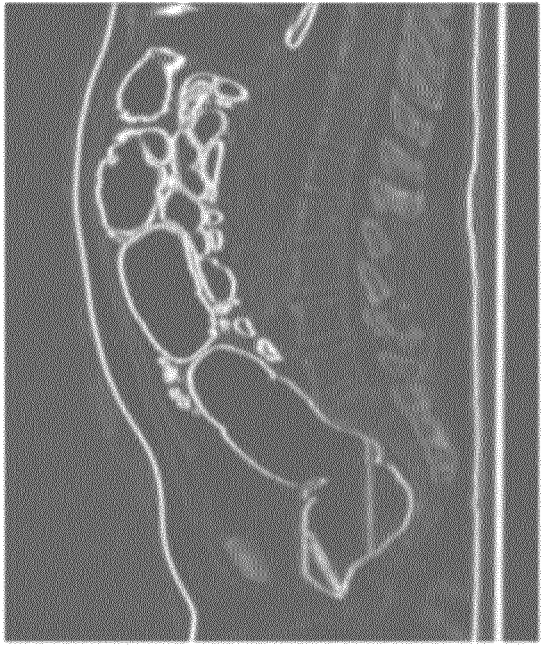
Fig. 3A     Fig. 3B

LOCAL SPECTRAL-COVARIANCE OR LOCAL SPECTRAL COVARIANCE DEFICITS COMPUTATION AND DISPLAY FOR HIGHLIGHTING OF RELEVANT MATERIAL TRANSITIONS IN SPECTRAL CT AND MR

FIELD OF THE INVENTION

The present invention generally relates to multispectral imaging, and in particular relates to two alternative apparatuses and methods for processing image data of an object of interest comprising at least two mono-energetic images acquired from different spectral channels, a medical imaging system, and a computer program element

BACKGROUND OF THE INVENTION

Multispectral imaging is becoming increasingly more common in clinical practice due to the rapid rise in computer technology and expanding literature exhibiting vast advantages over conventional single energy imaging. Spectral-CT, for example, generates a number of spectral channels for low- to high-energy levels, which are governed by Compton- and Photoelectric-effect to varying degree. The spectral channels can also be converted into various representations with pure Compton-, pure Photoelectric-, and pure (pseudo/virtual-) mono-energy-images. Typical dual-layer or dual-energy CT scanners generate two independent spectral channels, while photon-counting CT scanners or MR scanners or ultrasound (US) probes may generate a multitude of N independent spectral channels.

However, the rich multispectral information per voxel provided by spectral images may be difficult to condense into one view for efficient reading. Also, conventional images may be often preferred for viewing because of existing reading habits and accumulated expertise.

SUMMARY OF THE INVENTION

There may be a need to condense multispectral information into a single image.

The object of the present invention is solved by the subject-matter of the independent claims, wherein further embodiments are incorporated in the dependent claims. It should be noted that the following described aspects of the invention apply also for the two alternative apparatuses and methods, the medical imaging system, and the computer program element.

According to a first aspect of the present invention, there is provided an apparatus for processing image data of an object of interest comprising at least two mono-energetic images acquired from different spectral channels. The apparatus comprises an input module, a computation module, a rendering module, and an output module. The input module is configured for receiving the image data of the object of interest. The computation module is configured for determining local covariance matrices at a plurality of image positions in the at least two mono-energetic images. Each local covariance matrix is a matrix of local variances and local covariances between image intensities at one of the plurality image positions in the at least two mono-energetic images. The rendering module is configured for overlaying values of local variances and/or local covariances at the plurality of image positions with one or more of the at least two mono-energetic images. The output module is configured for providing an overlaying result.

In an example, the image data may be acquired by a dual- or multi-energy CT scanner. For example, in dual-energy CT, an additional attenuation measurement is obtained with a second x-ray spectrum (i.e. a second "energy"), allowing the differentiation of multiple materials. Alternatively, this allows quantification of the mass density of two or three materials in a mixture with known elemental composition.

In another example, the image data may be acquired by multi-parametric magnetic resonance imaging (MRI), which includes the following sequences: T1-weighted images, T2-weighted images, diffusion-weighted images (DWI), and dynamic contrast-enhanced imaging (DCEI).

In another example, the image data may be acquired by a set of ultrasound (US) modes, such as A/B/C/M-mode, or a collection of Harmonic modes.

Local covariance matrices at a plurality of image positions, such as pixel positions or voxel positions, in the first and second mono-energetic images are determined. Each local covariance matrix is a matrix of local variances and local covariances between image intensities at one of the plurality image positions in the first and second mono-energetic images. For each image position, the local variances and covariances may be computed using an image patch of neighbouring pixel or voxel. The "image patch" refers to a patch or group of pixels or voxels having a specific size, shape, and location corresponding to an image. For example, image patches can have a predetermined pixel width/height (e.g., 7×7, 9×9, 11×11, etc.) and a location for each image patch can be defined based on one or more centre pixels or voxels.

The local variances and covariances are positive definite numbers and reach their highest value at the location of a material transition. The local maxima of the variances and/or covariances of the intensities of the multi-channel images may be used to locate material transitions. These material transitions may be caused by contrast agent and be indicative of blood perfusion.

The covariance matrix values are characterizing certain material transition types, such as fat tissue, muscle tissue, air, contrast-agent tagged materials, etc. For examples, FIGS. 2A-2C demonstrate that the spectral local variance in the 'Photo'- and 'Scatter' images responds sensitively to colonic folds submerged in contrast-tagged stool residuals, whereas the spectral local covariance signifies in particular the tag-to-air material transitions.

The values of local variances and/or local covariances at the plurality of image positions may be overlaid with first mono-energetic image and/or the second mono-energetic image to generate an overlaid presentation of the first mono-energetic image and/or the second mono-energetic image. The overlaid presentation of the first mono-energetic image and/or the second mono-energetic image may be visualized on a display.

The local variances and/or covariances may be selected discretely for specific transition types only (e.g. transition between air and tissue), and the trace of the matrix may be used as the weight for display. Alternatively, the local variances and/or covariances may be weighted continuously for application-specific relevance.

In an example, values of local variances and/or local covariances, may be overlaid with colour encoding over the standard slice images.

In another example, cues of the material transitions may be conveyed using gray-values, such as gradual black-to-white colour, which ensures a familiar viewing experience as with conventional images, as well as possible deployment on widespread black-white-monitors. The absence/presence and weight of the overlay can be controlled or toggled interactively by an operator (referred to herein as "the user").

A further visualization option is three-dimensional (3D) rendering of the local variance magnitudes or regression values into a virtual display, which may be interactively rotatable.

In other words, relevant material transitions may be overlaid in colour or gray value, conveying additional spectral information. In this way, the user may assess just one image type, i.e. one spectral band, rather than having to read two or even a whole series of different image representations. Certain material transition may not be discernible in the conventional image, but in the spectral image channels. Further, since only transitions lines (rather than entire areas) are marked, the standard image is not cluttered with area-wise occluding overlays, and standard reading expertise does not have to be changed.

According to an embodiment of the present invention, the computation module is configured to compute each local variance matrix by a Gaussian convolutions operation.

In other words, the local variances and covariances may be computed by Gaussian convolutions operations, i.e. smoothing operations. The Gaussian filtering may be computed for various kernel widths, corresponding to the scale space, and thus an entire vector of covariance matrices can be computed for various values of covariance scale space tensor.

According to an embodiment of the present invention, the computation module is further configured to determine a number of eigenvalues of at least one of the local covariance matrices for determining a quantity of materials between which a material transition takes place.

In other words, the computation module is further configured to determine a number of eigenvalues of at least one of the local covariance matrices and to classify the at least one of the local covariance matrices into a material transition between N materials based on the number of eigenvalues, where N is greater than or equal to 2

In an example, a single eigenvalue of a local variance matrix may signify a two-material transition (e.g. between air and soft tissue).

In an example, two eigenvalues of a local variance matrix may signify a three-material transition (e.g. among air, soft tissue, and contrast-agent tagged material).

According to an embodiment of the present invention, the apparatus further comprises a classifier module configured for applying a pre-trained classifier to classify each of the local covariance matrices into a material transition type.

Examples of the classifier may include, but are not limited to, linear, maximum likelihood, random forest, support vector machine, or artificial neural network, may be used to classify the covariance at any position into a material transition type.

The result of classification may be one or several type-specific scalar values output from each local convariance matrix or covariance scale space tensor.

According to an embodiment of the present invention, the pre-trained classifier comprises at least one of: artificial neural networks, support-vector machines, maximum likelihood, or random forest.

According to an embodiment of the present invention, the plurality of image positions comprise locations of a material transition.

The location of material transitions may be identified based on edge detection. Edge detection is the name for a set of mathematical methods, which aim at identifying points in a digital image at which the image brightness changes sharply or, more formally, has discontinuities. The points at which image brightness changes sharply are typically organized into a set of curved line segments termed edges. Various techniques may be used for edge detection, such as Prewitt edge detection, Laplacian edge detection, LOG edge detection, canny edge detection, etc.

In this way, the local covariance matrices are computed only at locations of a material transition for identifying relevant multispectral material transitions. Accordingly, computational efforts may be reduced.

According to an embodiment of the present invention, the apparatus further comprises a display device configured for displaying the overlaying result.

In an example, the image data comprises at least one of image data acquired by spectral computed tomography (CT) or image data acquired by spectral magnetic resonance imaging (MRI).

According to a second aspect of the present invention, there is provided an apparatus for processing image data of an object of interest comprising at least two mono-energetic images acquired from different spectral channels. The apparatus comprises an input module, a computation module, and an output module. The input module is configured for receiving the image data of the object of interest. The computation module is configured for determining local covariance matrices at a plurality of image positions in the at least two mono-energetic images, and determining local covariance deficits based on a comparison between a product of local variances and a product of local covariances through all spectral channel combinations. Each local covariance matrix is a matrix of local variances and local covariances between image intensities at one of the plurality image positions in the at least two mono-energetic images. The output module is configured for providing the local covariance deficits preferably for being overlaid with one or more of the at least two mono-energetic images by means of graphical cues and/or as a machine-learning feature for performing material classification.

In other words, an alternative approach is proposed for processing image data. Unlike the approach specified in the first aspect of the present invention, which determines local variances and/or local covariances, the alternative approach in the second aspect of the present invention performs voxel- or pixelwise computation of the inter-channel covariance deficits. The multispectral covariance deficits may be mapped into colour overlays over the individual spectral channel or so-called conventional slices images. Alternatively or additionally, the inter-channel covariance deficits may be used as machine-learning features for performing material classification.

The proposed approach is independent of spatial drifts across the image volume. As will be discussed hereinafter, it may also allow fast computation with standard filters, which may be suitable for massively parallel processing e.g. on GPU. In this alternative approach, no Eigen- or singular value decomposition is required.

According to an embodiment of the present invention, the apparatus further comprises a rendering module configured for overlaying values of local covariance deficits at the plurality of image positions with one or more of the at least two mono-energetic images.

The multispectral covariance deficits may be conveyed to the reader by means of graphical cues, e.g. slice-wise colour overlays, maximum intensity projection (MIP), direct volume rendering (DVR), three-dimensional texture mapping, etc.

By overlying values of local covariance deficits with one or more mono-energetic images, it is possible to identify and navigate to spectrally salient locations in multi-spectral image volumes, e.g. as generated by photon-counting CT. Thus, the user may assess just one image type, i.e. one spectral band, and save the time to read all channel image volumes separately. Moreover, when the various covariance deficits are overlaid with different colours hues and opacity according to magnitude, then this allows an un-occluded view on smooth areas of vanishing variance, while flagging different material transitions. Thus, although the difference between different spectral channels may be subtle and may be further occluded by a different overall dynamic scaling and offsets of the multispectral channels, the proposed overlaid image, the user may still be able to identify the different material transitions in the overlaid image. In particular, the user may be able to identify subtle changes in injected contrast agent, indicating local blood perfusion differences.

According to an embodiment of the present invention, the apparatus further comprises a display device configured for displaying the overlaying result.

According to an embodiment of the present invention, the apparatus further comprises a classifier module configured for applying a pre-trained classifier to perform material classification at one or more of the plurality of image positions based on the local covariance deficits.

Examples of the pre-trained classifier may include, but are not limited to, linear discriminant analysis based classifier (LDA), support vector machine (SVM), random forest classifier, and convolutional neural network (CNN).

The accuracy of the classification may be increased with the addition of the local covariance deficits. For two spectral channels, the voxel- or pixelwise material classification may rely on each voxel/pixel's two mono-energy values, and the value of the local covariance deficits, yielding three features per voxel/pixel. For spectral multi-band images, the local covariance deficits may be a computation-efficient generalization of gradient magnitudes and correlations.

According to an embodiment of the present invention, the computation module is configured to determine the local covariance deficits in an image space or in a projection space.

According to a third aspect of the present invention, there is provided a medical imaging system. The medical imaging system comprises a scanner and an apparatus according to the first aspect and any associated example or according to the second aspect and any associated example. The scanner is configured for scanning an object of interest to acquire image data of the object of interest. The apparatus is configured for processing the image data of the object of interest.

According to a fourth aspect of the present invention, there is provided a computer-implemented method for processing image data of an object of interest comprising at least two mono-energetic images acquired from different spectral channels. The computer-implemented method comprises:
  receiving the image data of the object of interest;
  determining local covariance matrices at a plurality of image positions in the at least two mono-energetic images, wherein each local covariance matrix is a matrix of local variances and local covariances between image intensities at one of the plurality image positions in the at least two mono-energetic images;
  overlaying values of local variances and/or local covariances at the plurality of image positions with one or more of the at least two mono-energetic images; and
  providing an overlaying result.

In an example, the step of determining local covariance matrices further comprises the step of computing each local variance matrix by Gaussian convolutions operations.

In an example, the step of determining local covariance matrices further comprises determining a number of eigenvalues of at least one of the local covariance matrices for determining a quantity of materials between which a material transition takes place.

In an example, the method further comprises the step of applying a pre-trained classifier to classify each of the local covariance matrices into a material transition type.

According to a fifth aspect of the present invention, there is provided a computer-implemented method for processing image data of an object of interest comprising at least two mono-energetic images acquired from different spectral channels at different energies, the computer-implemented method comprising:
  receiving the image data of the object of interest;
  determining local covariance matrices at a plurality of image positions in the at least two mono-energetic images, wherein each local covariance matrix is a matrix of local variances and local covariances between image intensities at one of the plurality image positions in the at least two mono-energetic images;
  determining local multispectral covariance deficits based on a comparison between a product of local variances and a product of local covariances through all spectral channel combinations; and
  providing the local covariance deficits preferably for being conveyed by means of graphical cues and/or as a machine-learning feature.

In an example, the computer-implemented method further comprises overlaying values of local covariance deficits at the plurality of image positions with one or more of the at least two mono-energetic images.

In an example, the computer-implemented method further comprises displaying the overlaying result.

In an example, the computer-implemented method further comprises applying a pre-trained classifier to perform material classification at one or more of the plurality of image positions based on the local covariance deficits.

In an example, the computer-implemented method further comprises determining the local covariance deficits in an image space or in a projection space.

According to another aspect of the present invention, there is provided a computer program element configured, during execution, to perform the method step of the third aspect and any associated example.

In an example, there is provided a computer readable medium comprising the computer program element.

Advantageously, the benefits provided by any of the above aspects equally apply to all of the other aspects and vice versa.

As used herein, the term "learning" in the context of machine learning refers to the identification and training of suitable algorithms to accomplish tasks of interest. The term "learning" includes, but is not restricted to, association learning, classification learning, clustering, and numeric prediction.

As used herein, the term "machine-learning" refers to the field of the computer sciences that studies the design of computer programs able to induce patterns, regularities, or rules from past experiences to develop an appropriate response to future data, or describe the data in some meaningful way.

As used herein, the term "data-driven model" in the context of machine learning refers to a suitable algorithm that is learnt on the basis of appropriate training data.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2A shows an exemplary 'Photo'-image overlaid with local variance magnitudes.

FIG. 2B shows an exemplary 'Scatter'-image overlaid with local variance magnitudes.

FIG. 2C shows an exemplary 'Scatter'-image overlaid with local covariance magnitudes.

FIG. 3A shows an exemplary composite image of 'Photo'- and 'Scatter'-images with local variance magnitudes.

FIG. 3B shows a further exemplary composite image by subtracting the spectral local covariance from the exemplary composite image of FIG. 3A.

DETAILED DESCRIPTION OF EMBODIMENTS

In the following, the approach is described in relation with an abdominal spectral CT scan with contrast agent-tagged stool residuals in the colon. Although the following detailed description is described using application to CT virtual colonoscopy for the purposes of illustration, anyone of ordinary skill in the art will appreciate that the method, apparatus, and medical imaging system described above and below can be adapted to other object of interest, e.g. vessel wall, and to other imaging modality, e.g. MRI. Accordingly, the following described examples are set forth without any loss of generality to, and without imposing limitations upon, the claimed invention.

Figure 1:
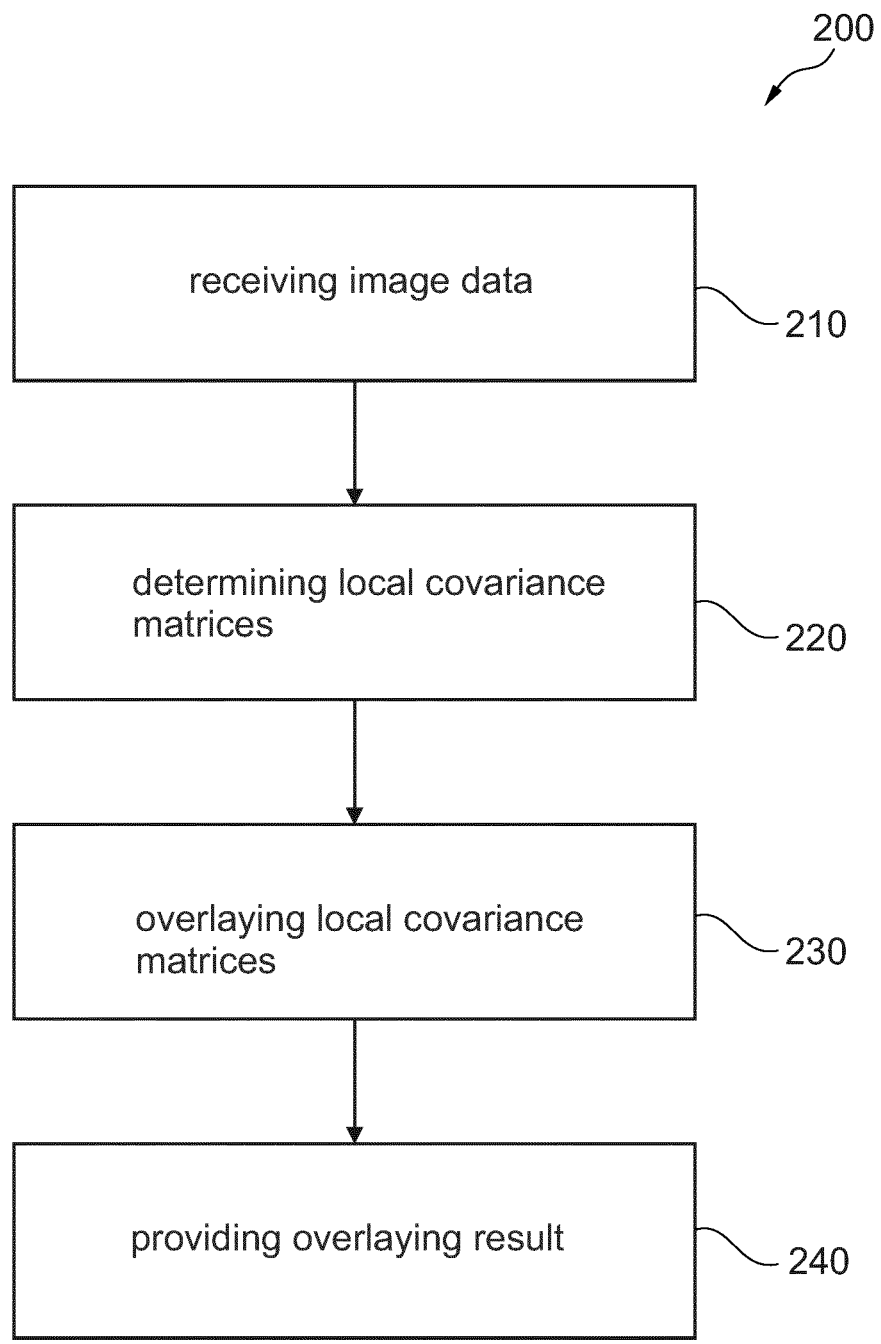
FIG. 1 shows a flow chart of a computer-implemented method.

FIG. 1 shows a flow chart of a computer-implemented method 200 according to some embodiments of the present disclosure. The computer-implemented method 200 is proposed for processing image data of an object of interest comprising at least two mono-energetic images, such as a first mono-energetic image acquired at a first energy and a second mono-energetic image acquired at a second energy different from the first energy.

The computer-implemented method 200 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 200 may be written in any combination of one or more programming languages, including an object oriented programming language such as JAVA, SMALLTALK, C++, Python, or the like and conventional procedural programming languages, such as the "C" programming language or similar programming languages.

In step 210, i.e. step a), the image data of the object of interest is received.

The medical image may be a two-dimensional image comprising image pixel data or a three-dimensional image comprising image voxel data.

In an example, the object of interest is a colon. In an example, the object of interest is a lumen of vasculature.

In an example, the image data may be acquired by spectral CT. For example, the basic idea of dual energy imaging in CT is to acquire two data sets at low and high energy levels and to use the pairs of the data sets to deduce additional information about the patient. The physical basis of dual energy imaging includes two main mechanisms of the interaction of X rays with matter in the clinically relevant diagnostic energy-range from 30 keV to 140 keV, and the two interactions are photoelectric absorption and Compton scattering, each having its own functional dependence on x-ray energy. Photoelectric absorption is a rapidly decreasing function of energy for generating a 'Photo'-image, while Compton scatter is a gentle function of energy for generating a 'Scatter'-image.

In another example, the image data may be acquired by multi-parametric MRI.

In step 220, i.e. step b), local covariance matrices are determined at a plurality of image positions in the first and second mono-energetic images. Each local covariance matrix is a matrix of local variances and local covariances local variances and local covariances between image intensities at one of the plurality image positions in the first and second mono-energetic images. For local variances at each pixel or voxel location, we use statistics of a small patch of neighbouring pixel or voxel, which is also referred to as image patch. Each image patch represents one or a group of pixels in a two-dimensional medical image or one or a group of voxels in a three-dimensional medical image. For example, image patches may have a predetermined pixel width/height (e.g., 7×7, 8×8, 9×9, etc.) and a location for each image patch may be defined based on one or more centre pixels or voxels.

In an example, for two spectral channels, the local covariance matrix has a 2×2 matrix of covariances, of which three are independent.

In an example, for N (N>2) spectral channels, the local covariance matrix has an N×N matrix of covariances.

Optionally, the local variances and covariances may be computed by Gaussian convolution operations:

$$\mathrm{var}_{ii}(x) = G_\sigma * (I_i(x) \cdot I_i(x)) - (G_\sigma * (I_i(x) \cdot G * (I_i(x)))$$

$$\mathrm{cov}_{ik}(x) = G_\sigma * (I_i(x) \cdot I_k(x)) - (G_\sigma * (I_i(x) G * (I_k(x)))$$

where $G_\sigma$ is a Gaussian convolution and a is the kernel width of the Gaussian filter, $I_i(x)$ is the image intensity at a certain image position x at spectral band i, and $I_k(x)$ is the image intensity at a certain image position x at spectral band k.

The Gaussian filter G, may be computed for various kernel widths a, corresponding to the scale space, and thus an entire vector of covariance matrices may be computed for various values of σ to obtain a covariance scale space tensor.

The local variances and covariances are positive definite numbers, and reach their highest value at locations of a material transition. The softness of the filter response is influenced by the Gaussian filter width σ.

In comparison to gradient vectors, the local variance is not directed and not prone to noise.

Optionally, the method further comprises the step of determining a number of eigenvalues of at least one of the local covariance matrices for determining a quantity of materials between which a material transition takes place.

For example, for dual energy CT, two spectral bands ('Photo'— and 'Scatter'-image) yield a 2×2 local covariance matrix. A single eigenvalue of the local covariance matrix signifies a two-material transition, while two eigenvalues signifies a three-material transition.

In step 230, i.e. step c), values of local variances and/or local covariances at the plurality of image positions are overlaid with first mono-energetic image and/or the second mono-energetic image.

In an example, the values of local variances and/or local covariances may be overlaid with colour encoding over the standard slice images.

Another visualization option is 3D rendering of the local variance magnitudes or regression values into a virtual display, which is interactively rotatable.

As a further option, cues of the transitions can be conveyed using gray-values (gradual black-to-white colour, rather than colour overlays), which ensures a familiar viewing experience as with conventional images, as well as possible deployment on widespread black-white-monitors. The absence/presence and weight of the overlay can be controlled/toggled interactively by the user.

For example, FIGS. 2A to 2C show an example with two spectral bands ('Photo'— and 'Scatter'-image), in an abdominal spectral CT scan with contrast agent-tagged stool residuals in the colon.

In particular, FIG. 2A shows an exemplary 'Photo'-image overlaid with local variance magnitudes, shown as brighter contour. This image demonstrates that the spectral local variance in the 'Photo' image responds sensitively to colonic folds submerged in contrast-tagged stool residuals.

FIG. 2B shows an exemplary 'Scatter'-image overlaid with local variance magnitudes, shown as brighter contour. This image demonstrates that the spectral local variance in the 'Scatter' image also responds sensitively to colonic folds submerged in contrast-tagged stool residuals.

FIG. 2C shows an exemplary 'Scatter'-image overlaid with local covariance magnitudes, shown as brighter contour. This image demonstrates that the spectral local covariance signifies in particular the tag-to-air material transitions.

As the spectral local variances in the 'Photo'- and 'Scatter'-images both respond sensitively to colonic folds submerged in contrast-tagged stool residuals, these two images may be composited to highlight colonic folds submerged in contrast-tagged stool residuals. An exemplary composite image is illustrated in FIG. 3A.

Additionally, the contour of colonic folds submerged in contrast-tagged stool residuals may be further highlighted by subtracting the spectral local covariance, which signifies in particular the tag-to-air material transitions, from the composite image in FIG. 3A. An exemplary subtraction result is illustrated in FIG. 3B.

Turning back to FIG. 1, in step 240, i.e. step d), the overlaying result is provided e.g. to a display (for example, a built-in screen, a connected monitor or projector) or to a file storage (for example, a hard drive or a solid state drive).

It should also be understood that, unless clearly indicated to the contrary, in any methods claimed herein that include more than one step or act, the order of the steps or acts of the method is not necessarily limited to the order in which the steps or acts of the method are recited.

With the proposed method, the user may assess just one image type, i.e. one spectral band, rather than having to read two or even a whole series of different image representations. Additionally, relevant material transitions may be overlaid in colour or gray value, conveying additional spectral information. Certain material transition may not be discernible in the conventional image, but in the spectral image channels. Further, since only transitions lines (rather than entire areas) are marked, the standard image is not cluttered with area-wise occluding overlays, and standard reading expertise does not have to be changed.

Optionally, a pre-trained classifier may be applied to classify each of the local covariance matrices into a material transition type.

In an example, the classifier is a pre-trained machine-learning model. The machine learning model has been pre-trained on historic patient data retrievable from image repositories from the same hospitals or other hospitals. Preferably, a supervised learning scheme is used wherein the historic imagery is pre-labelled by experienced clinicians. Labelling may provide data including local covariance matrices at a plurality of image positions of multiple images and the corresponding classified material transition types (e.g. transitions between air-tissue, tissue-content agent tagged materials, or etc.).

Training of the classifier may include the following steps of receiving the training data, applying the classifier to the training data, in one or more iterations. As a result of this application the pre-trained classifier is then obtained, which can then be used in deployment. In deployment, new image data, can be applied to the pre-trained classifier to obtain the result of classification for this new data.

For example, a neural-network model, also referred to as artificial neural networks (ANNs), may be used as an example of the classifier. However, other machine learning techniques such as support vector machines, maximum likelihood, random forest, or other may be used instead of neural networks.

The trained classifier attempts to approximate the correlation between the local covariance matrices and the material transition types. The approximation may be achieved in a learning or training process where parameters, itself forming a high dimensional space, are adjusted in an optimization scheme based on training data.

In yet more detail, the classifier may be realized as artificial neural-network ("ANN"). The ANN is operable in two modes: "training mode/phase" and "deployment mode/phase". In training mode, an initial model of the ANN is trained based on a set of training data to produce a trained ANN model. In deployment mode, the pre-trained ANN model is fed with non-training, new data, to operate during normal use. The training mode may be a one-off operation or this is continued in repeated training phases to enhance performance. All that has been said so far in relation to the two modes is applicable to any kind of machine learning algorithms and is not restricted to ANNs.

The ANN comprises a set of interconnected nodes organized in layers. The ANN includes an output layer and an input layer. The input layer may be a matrix whose size (rows and columns) matches that of the training input local covariance matrices. The output layer may be a vector or matrix with size matching the size chosen for material transition types.

The ANN has preferably a deep learning architecture, that is, in between the output layer and input layer there is at least one, preferably two or more, hidden layers.

Nodes are associated with numbers, called "weights", which represent how the node responds to input from earlier nodes in a preceding layer.

The set of all weights defines a configuration of the ANN. In the learning phase, an initial configuration is adjusted based on the training data using a learning algorithm such as forward-backward ("FB")-propagation or other optimization schemes, or other gradient descent methods. Gradients are taken with respect of the parameters of the objective function.

The training mode is preferably supervised, that is, is based on annotated training data. Annotated training data includes pairs or training data items. For each pair, one item is the training input data and the other item is target training data known a priori to be correctly associated with its training input data item. This association defines the annotation and is preferably provided by a human expert. The training pair includes local covariance matrices as training input, and associated with a material transition type as an output.

In training mode, preferably multiple such pairs are applied to the input layer to propagate through the ANN until an output emerges at the output layer. Initially, the output is in general different from the target. During the optimization, the initial configuration is readjusted so as to achieve a good match between input training data and their respective target for all pairs. The match is measured by way of σ similarity measure which can be formulated in terms of on objective function, or cost function. The aim is to adjust the parameters to incur low cost, that is, a good match.

The training data sets are applied to the initially configured ANN and is then processed according to a learning algorithm such as the FB-propagation algorithm as mentioned before. At the end of the training phase, the so pre-trained ANN may then be used in deployment phase to compute the material transition types for new data, that is, newly acquired images not present in the training data.

The result of classification may be one or several type-specific scalar values output from each local covariance matrix or covariance scale space tensor.

In an example, the local variances may be selected discretely for specific transition types only, and the trace of the matrix may be used as the weight for display.

Alternatively to a 'hard' classification, the local variances and/or covariances may be weighted continuously, e.g. by regression rather than classification, for application-specific relevance.

Figure 4:
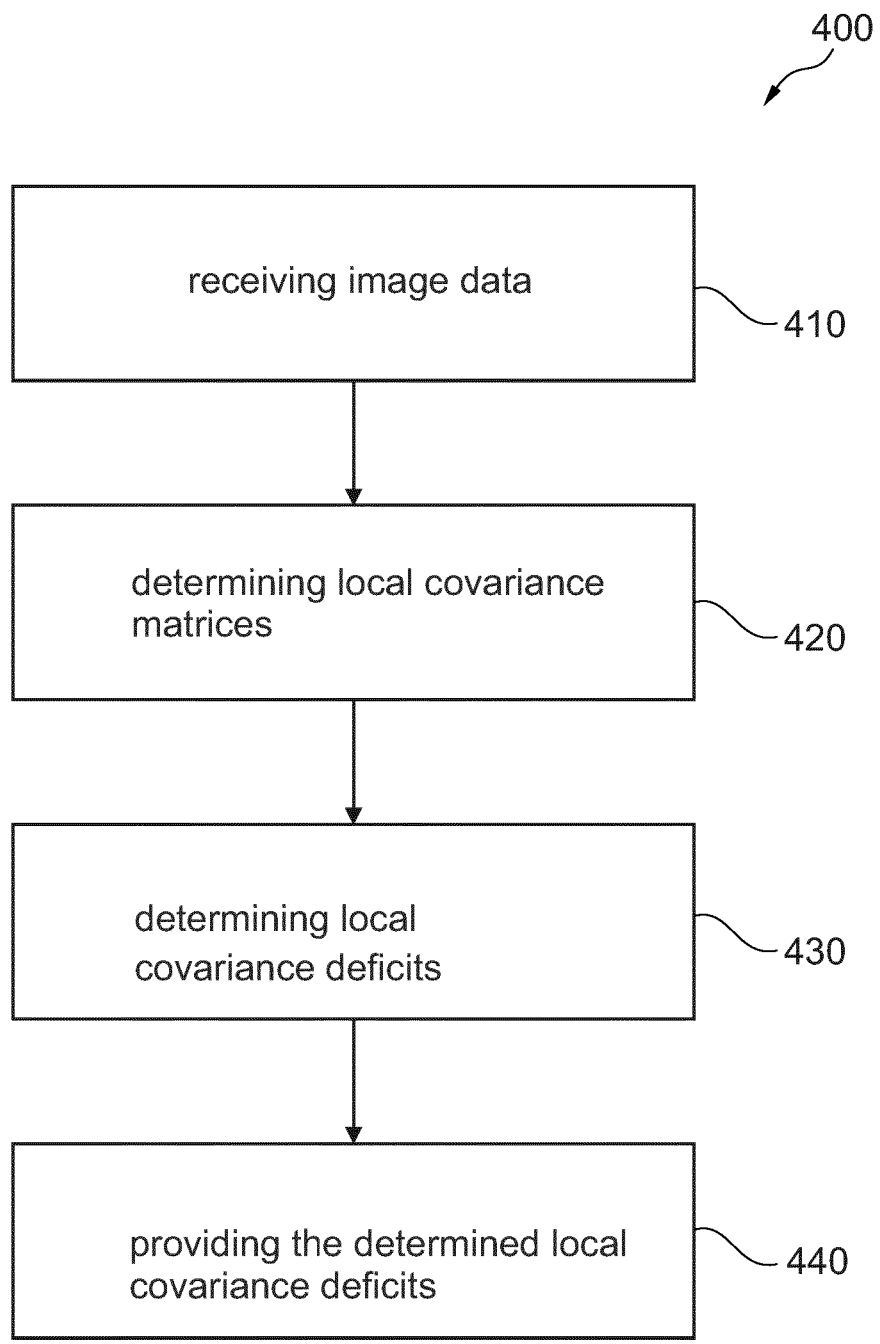
FIG. 4 shows a flow chart of an alternative computer-implemented method.

FIG. 4 illustrates a flow chart of an alternative embodiment of σ computer-implemented method 400 for processing image data of an object of interest comprising at least two mono-energtic images acquired from different spectral channels at different energies.

In step 410, the image data of the object of interest is received.

In step 420, local covariance matrices are determined at a plurality of image positions in the first and second mono-energetic images. Each local covariance matrix is a matrix of local variances and local covariances local variances and local covariances between image intensities at one of the plurality image positions in the first and second mono-energetic images. The local covariance matrices may be determined according to the approach described above with respect to step 220 in FIG. 1

In step 430, local multispectral covariance deficits are determined based on a comparison between a product of local variances and a product of local covariances through all spectral channel combinations.

As discussed above, the local variances and covariances may be computed by using spatially symmetric Gaussian or Binomial convolution filters (or multiplications in Fourier space).

For two spectral channels i and k, the local variances and covariances may be computed by the following Gaussian convolution operations:

$$\text{var}_{ii}(x) = G_\sigma(I_i(x) \cdot I_i(x)) - (G_\sigma * (I_i(x) \cdot G^*(I_i(x)))$$

$$\text{cov}_{ik}(x) = G_\sigma(I_i(x) \cdot I_k(x)) - (G_\sigma * (I_i(x) \cdot G^*(I_k(x)))$$

where $G_\sigma$ is a Gaussian convolution and a is the kernel width of the Gaussian filter, $I_i(x)$ is the image intensity at a certain image position x at spectral band i, and $I_k(x)$ is the image intensity at a certain image position x at spectral band k.

The correlation deficit between the two spectral channels may be defined as $$\text{correlation deficit} = 1 - (\text{cov}_{ik}(x)\text{cov}_{ik}(x))/(\text{var}_{ii}(x)\text{var}_{kk}(x))$$

The correlation deficit, however, is numerically unstable for locally vanishing variances, when the denominator approaches zero.

Therefore, the present disclosure proposes to consider the local covariance deficit, which is positive semi-definite. The local covariance deficit at a certain image position x may be defined as $$\text{Covariance deficit} = \text{cov}_{ik}(x)\text{cov}_{ik}(x) - \text{var}_{ii}(x)\text{var}_{kk}(x) \geq 0$$

Optionally, the sign of the mutual covariance can be multiplied to yield the following signed covariance deficit:

$$\text{Signed covariance deficit} = \text{sign}(\text{cov}_{ik}(x)) \cdot \text{Covariance deficit}$$

The covariance deficit is positive semi-definite and vanishes smoothly without singularities at vanishing local variance.

For N (N>2) spectral channels, we consider the following quadratic matrix of covariances:

$$C = \{[I_i(x) - m_i] \cdot [I_k(x) - m_k]^T\}$$

where $I_i(x)$ is the image intensity at a certain image position x at spectral band i out of the N spectral channels, $I_k(x)$ is the image intensity at a certain image position x at spectral band k out of the N spectral channels, $m_i$ is the local mean value at spectral band i, and $m_k$ is the local mean value at spectral band k.

This yields N(N−1)/2 independent covariance deficit terms adding up to the multispectral covariance deficit, which responds independently of which spectral channel shows the added information.

The covariance deficits may be defined as $$\text{Covariance deficit} = 1^t(\text{diag}(C) \cdot \text{diag}(C)^t - C \odot C)1$$

where $\odot$ is the Hadamard matrix product, and where the diag operator extracts the main diagonal of σ matrix, and 1 denotes a vector of all ones.

As an alternative formulation, we consider the Kronecker product $C \otimes C$, i.e. the outer matrix product of the quadratic covariance matrix C, and compare the traces tr:

$$\text{Covariance deficit} = tr(C \otimes C) - tr(C \cdot C)$$

where the second term corresponds to the squared Frobenius matrix norm of C.

In some implementations, the summation can be done efficiently directly interleaved with the Gaussian convolution operations e.g. using an overlap-add scheme to exploit inherent parallelity and small memory footprint. Hence, the computational effort is $O(N^2M)$ runtime and $O(M)$ memory where M is the number of voxels in the image.

In the above-described example, the computation of the multispectral covariance deficits is carried out in the image space. Alternatively, the computation of the multispectral covariance deficit may be carried out in the projection space before reconstruction of the image volume. In this case, the local variances and covariances may be computed by adapted non-isotropic smoothing filter shapes. Finally, the projected covariance deficit is reconstructed into image space.

In step 440, the local covariance deficits are provided preferably for being overlaid with one or more of the at least two mono-energetic images and/or as a machine-learning feature for performing material classification.

In one option, the values of local covariance deficits at the plurality of image positions may be overlaid with one or more of the at least two mono-energetic images. For example, the multispectral covariance deficits may be overlaid by means of graphical cues, e.g. slice-wise colour overlays, maximum intensity projection (MIP), direct volume rendering (DVR), three-dimensional texture mapping, etc.

Of particular interest is the mapping of the multispectral covariance deficit into colour overlays over the individual spectral channel or so-called conventional slices images. By construction, the covariance deficit is highest at locations of material transitions. Thus, when the various covariance deficits are overlaid with different colours hues and opacity according to magnitude, then this allows an un-occluded view on smooth areas of vanishing variance, while flagging different material transitions.

Figure 5A:
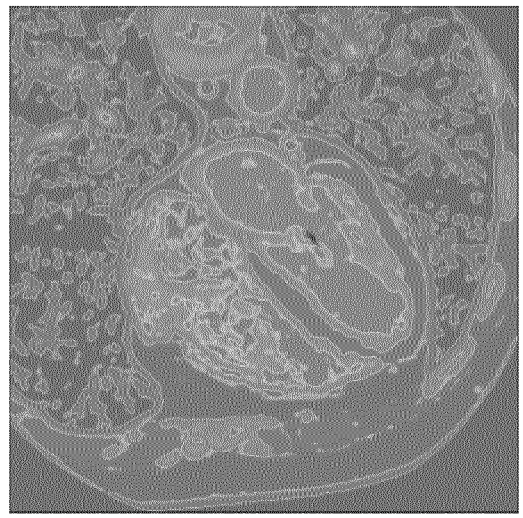
FIG. 5A shows an exemplary covariance deficit image volume, where the multispectral covariance deficits are overlaid by means of 3D textual mapping.
Figure 5B:
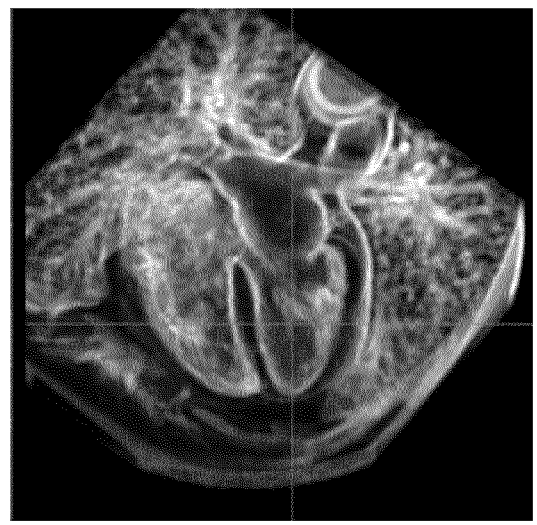
FIG. 5B shows an exemplary covariance deficit image volume, where the multispectral covariance deficits are represented using a rotational maximum intensity projection (MIP).

FIGS. 5A and 5B shows two exemplary covariance deficit image volumes using a 9×9×9 binomial smoothing kernel.

In the example shown in FIG. 5A, the multispectral covariance deficits are overlaid by means of 3D textual mapping. The dark grey areas in FIG. 5A correspond to the blue colour, which represents the vanishing covariance deficit. The light grey areas in FIG. 5A correspond to the yellow colour, which represents significant covariance deficit corresponding to added multispectral information.

In the example shown in FIG. 5B, the covariance deficits are represented using a rotational maximum intensity projection (MIP).

For certain application, it may be beneficial to evaluate or present the covariance deficit only in selected regions of interest (e.g. the cardiac muscle). For example, an augmentation may be performed with an organ shape model.

In another option, it is possible to apply a pre-trained classifier (e.g. SVM, CNN, etc.) to perform material classification at one or more of the plurality of image positions based on the local covariance deficits. The local covariance deficits may add spectral information to increase the accuracy of the classification. For example, the classification may rely on each pixel/voxel's mono-energy values (e.g. two mono-energy values for two-channel spectral CT) and the value of the local covariance deficit, yielding multiple features per pixel. Of course, one or more other features may be added to each pixel/voxel, such as local mean values, local covariance matrix, etc.

Figure 6:
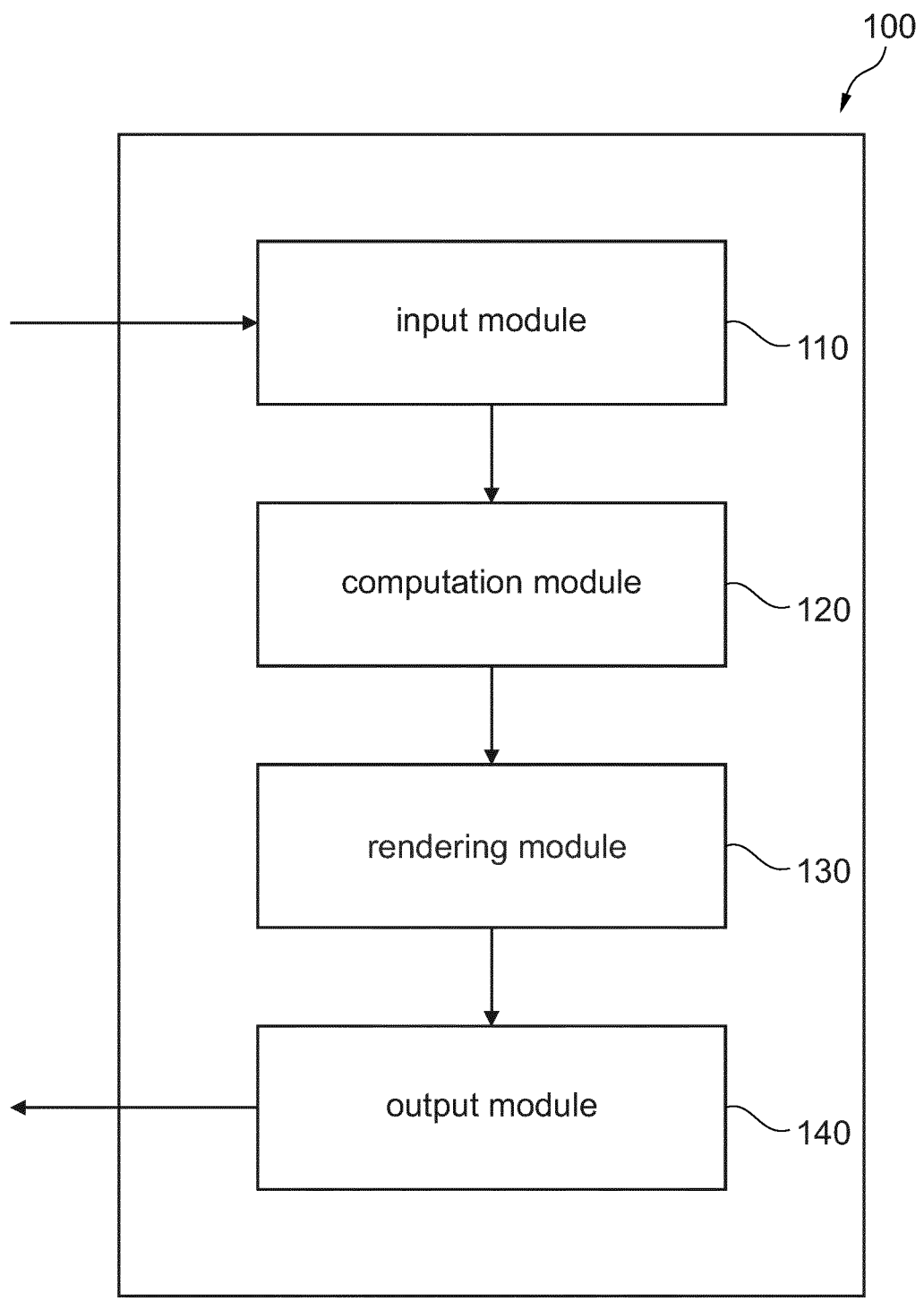
FIG. 6 schematically shows an example of an apparatus.

FIG. 6 schematically shows an example of an apparatus 100 for processing image data of an object of interest comprising a first mono-energetic image acquired at a first energy and a second mono-energetic image acquired at a second energy different from the first energy.

The apparatus 100 comprises an input module 110, a computation module 120, a rendering module 130, and an output module 140. Each module may be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

The apparatus 100 may be any computing device, such as mobile devices, laptop and desktop computers, wearable computing devices, and other computing devices, suitable for processing image data.

The input module 110 is configured for receiving the image data of the object of interest. The medical image may be a two-dimensional image comprising image pixel data or a three-dimensional image comprising image voxel data. Examples of the imaging modality may include, but are not limited to, spectral CT or multi-parametric MRI.

The computation module 120 is configured for determining local covariance matrices at a plurality of image positions in the first and second mono-energetic images. The plurality of image positions include the locations of a material transition. Each local covariance matrix is a matrix of local variances and local covariances between image intensities at one of the plurality image positions in the first and second mono-energetic images. For local variances at each pixel or voxel location, statistics of a small patch of neighbouring pixel or voxel, i.e. image patch, may be used for the calculation.

Optionally, the computation module 120 may be configured to compute each local variance matrix by a Gaussian convolutions operation.

Optionally, the computation module 120 may be further configured to determine a number of eigenvalues of at least one of the local covariance matrices for determining a quantity of materials between which a material transition takes place.

In an example, a single eigenvalue of σ local variance matrix may signify a two-material transition e.g. between air and soft tissue.

In an example, two eigenvalues of σ local variance matrix may signify a three-material transition, e.g. among air, soft tissue, and contrast-agent tagged material.

The rendering module 130 is configured for overlaying values of local variances and/or local covariances at the plurality of image positions (e.g. in colour or gray values) with first mono-energetic image and/or the second mono-energetic image. Exemplary overlaying results are shown in FIGS. 2A-2C and FIGS. 3A-3C.

The output module 140 is configured for providing an overlaying result e.g. to a display (for example, a built-in screen, a connected monitor or projector) or to a file storage (for example, a hard drive or a solid state drive).

Optionally, the apparatus 100 may further comprise a classifier module configured for applying a pre-trained classifier, such as artificial neural networks, support-vector machines, maximum likelihood, or random forest to classify the local covariance matrices into a material transition type.

Optionally, the apparatus may comprise a display device (not shown) configured for displaying an overlaying result.

Figure 7:
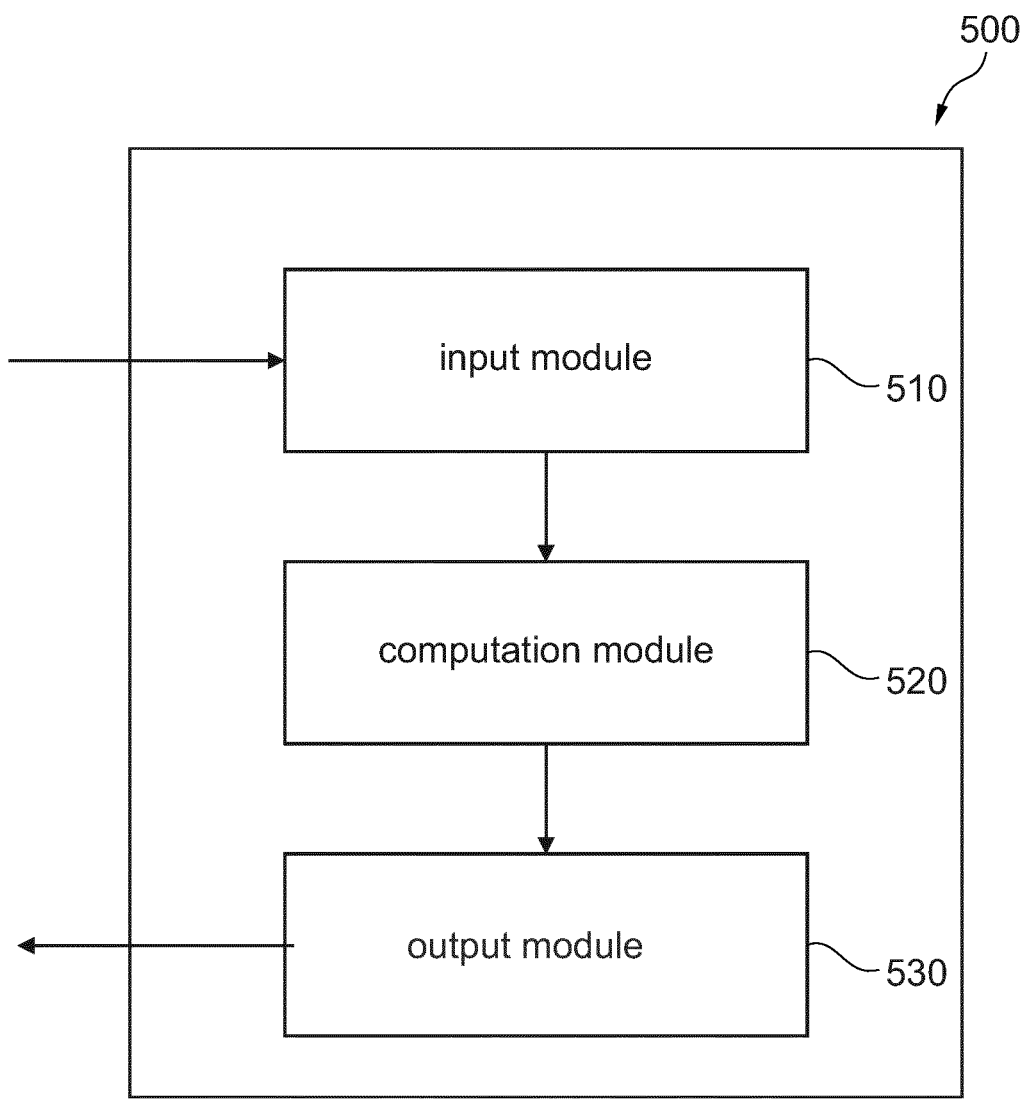
FIG. 7 schematically shows an alternative example of an apparatus.

FIG. 7 schematically shows an alternative embodiment of an apparatus 500, which comprise an input module 510, a computation module 520, and an output module 530.

The input module 510 may be substantially functionally equivalent to input module 110 illustrated in FIG. 6.

The computation module 520 is configured for determining local covariance matrices at a plurality of image positions in the first and second mono-energetic images. Each local covariance matrix is a matrix of local variances and local covariances between image intensities at one of the plurality image positions in the at least two mono-energetic images. The local covariance matrices may be determined according to the method described with respect to step 220 in FIG. 1.

The computation module 520 is further configured to determine local covariance deficits based on a comparison between a product of local variances and a product of local covariances through all spectral channel combinations. The local covariance deficits may be determined according to the method described with respect to step 430 in FIG. 4. The computation module may be configured to determine the local covariance deficits in an image space or in a projection space.

The output module 530 is configured for providing the local covariance deficits preferably for being overlaid with one or more of the at least two mono-energetic images and/or as a machine-learning feature for performing material classification.

In some examples, the apparatus 500 may further comprise a rendering module (not shown) configured for overlaying values of local covariance deficits at the plurality of image positions with one or more of the at least two mono-energetic images. Exemplary overlaying results are shown in FIGS. 5A-5B. The apparatus 500 may further comprise a display (not shown) for displaying the overlaying results.

In some examples, the apparatus 500 may further comprise a classifier module (not shown) configured for applying a pre-trained classifier to perform material classification at one or more of the plurality of image positions based on the local covariance deficits.

Figure 8:
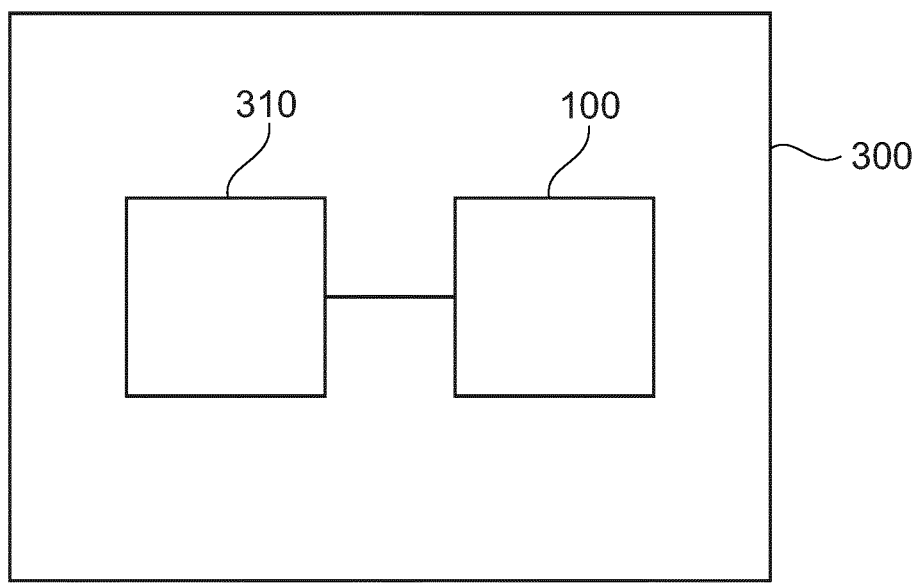
FIG. 8 schematically shows an example of a medical imaging system.

FIG. 8 schematically shows a medical imaging system 300 according to some embodiments of the present disclosure.

The medical imaging system 300 comprises a scanner 310 configured to scan an object of interest to acquire image data of the object of interest. The scanner 310 may be a spectral CT-scanner or an MRI scanner.

The medical imaging system 300 further comprises an apparatus 100 according to the example described with respect to FIG. 6 or the example described with respect to FIG. 7 for processing the image data of the object of interest.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of σ number or list of elements, and, optionally, additional unlisted items. Only terms clearly indicated to the contrary, such as "only one of" or "exactly one of," or, when used in the claims, "consisting of," will refer to the inclusion of exactly one element of σ number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of σ user. A computer program may be loaded into a working memory of σ data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of σ data processor from such a network. According to a further exemplary embodiment of the present invention, a medium for making a computer program element available for downloading is provided, which computer program element is arranged to perform a method according to one of the previously described embodiments of the invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A computer-implemented method for processing image data of an object of interest, comprising:
   receiving the image data of the object of interest;
   determining local covariance matrices at a plurality of image positions in at least two mono-energetic images acquired from different spectral channels, wherein each local covariance matrix is a matrix of local variances and local covariances between image intensities at one of the plurality image positions in the at least two mono-energetic images;
   determining local multispectral covariance deficits based on a comparison between a product of local variances and a product of local covariances through all spectral channel combinations; and
   providing the local covariance deficits as a machine-learning feature for performing material classification.

2. The method according to claim 1, further comprising overlaying values of local covariance deficits at the plurality of image positions with one or more of the at least two mono-energetic images.

3. The method according to claim 2, further comprising displaying an overlaying result.

4. The method according to claim 1, further comprising applying a pre-trained classifier to perform material classification at one or more of the plurality of image positions based on the local covariance deficits.

5. The method according to claim 1, further comprising determining the local covariance deficits in an image space or a projection space.

6. An apparatus for processing image data of an object of interest, comprising:
   a memory that stores a plurality of instructions; and
   a processor coupled to the memory and configured to execute the plurality of instructions to:
   receive the image data of the object of interest;
   determine local covariance matrices at a plurality of image positions in at least two mono-energetic images acquired from different spectral channels, wherein each local covariance matrix is a matrix of local variances and local covariances between image intensities at one of the plurality image positions in the at least two mono-energetic images;
   determine local multispectral covariance deficits based on a comparison between a product of local variances and a product of local covariances through all spectral channel combinations; and
   provide the local covariance deficits as a machine-learning feature for performing material classification.

7. The apparatus according to claim 6, wherein the processor is further configured to compute each local variance matrix by a Gaussian convolutions operation.

8. The apparatus according to claim 6, wherein the processor is further configured to apply a pre-trained classifier to classify each of the local covariance matrices into a material transition type.

9. The apparatus according to claim 6, wherein the plurality of image positions comprises locations of a material transition.

10. The apparatus according to claim 6, wherein the processor is further configured to overlay values of local covariance deficits at the plurality of image positions with one or more of the at least two mono-energetic images.

11. The apparatus according to claim 10, further comprising a display configured to display an overlaying result.

* * * * *